United States Patent [19]

McCullough

[11] 4,048,072
[45] Sept. 13, 1977

[54] AIR DIFFUSERS

[75] Inventor: J. Robert McCullough, West Chester, Pa.

[73] Assignee: Schramm, Inc., West Chester, Pa.

[21] Appl. No.: 624,747

[22] Filed: Oct. 23, 1975

[51] Int. Cl.² .......................... B01F 3/04; C02C 1/12
[52] U.S. Cl. .................................... 210/220; 261/122
[58] Field of Search ...................... 210/5, 14, 15, 220, 210/221 R, 194; 239/145; 261/121 R, 122, 123, 124

[56] References Cited

U.S. PATENT DOCUMENTS

| | | | |
|---|---|---|---|
| 1,326,174 | 12/1919 | Borcherdt | 261/122 |
| 1,717,713 | 6/1929 | Logan | 261/122 |
| 1,910,386 | 5/1933 | Garrett | 261/122 |
| 2,777,815 | 1/1957 | Forrest | 261/124 X |
| 3,033,372 | 5/1962 | Riddick | 210/14 X |
| 3,775,307 | 11/1973 | McWhirter et al. | 210/14 |
| 3,782,704 | 1/1974 | Schramm et al. | 261/124 |
| 3,808,123 | 4/1974 | Neel | 210/15 |
| 3,841,997 | 10/1974 | McGee | 210/15 |
| 3,893,924 | 7/1975 | LeCompte, Jr. et al. | 261/124 X |

FOREIGN PATENT DOCUMENTS

| | | | |
|---|---|---|---|
| 1,029,754 | 5/1958 | Germany | 210/15 |
| 383,280 | 12/1964 | Switzerland | 261/124 |
| 156,817 | 1/1921 | United Kingdom | 210/220 |
| 412,842 | 7/1934 | United Kingdom | 261/122 |

Primary Examiner—Frank A. Spear, Jr.
Assistant Examiner—Robert H. Spitzer
Attorney, Agent, or Firm—Smith, Harding, Earley & Follmer

[57] ABSTRACT

A radial configuration of flexible diffuser tubes eliminates short-circuiting by automatically producing a flow pattern extending well beyond the radial extent of the diffuser. A slitted diaphragm at the outer end of a diffuser tube facilitates the removal of water during start-up. A preferred diffuser comprises an inner perforated conduit surrounded by a fabric tube through which air is released into the liquid. Providing a space between the conduit and the fabric tube and filling the space with gravel pellets provides for greatly improved uniformity in air diffusion.

24 Claims, 12 Drawing Figures

AIR DIFFUSERS

BACKGROUND OF THE INVENTION

This invention relates to air diffusers of the type used in aerating reservoirs and sewage or industrial waste treatment lagoons.

In aerating lagoons using perforated flexible tubing, the practice has generally been to arrange the tubes in a parallel configuration transverse to the direction of flow through the lagoon. In many cases the parallel array of tubing did not cover the entire lagoon, but instead permitted "short circuit" paths to exist which allowed liquid to flow through the lagoon without being aerated. This was especially true in lagoons having sloping side walls. Most lagoons are constructed with flat bottoms and side walls sloping at an angle between 15° to 40° from the horizontal. A diffuser tube cannot be placed partly on a side wall and partly on the bottom, because the hydrostatic pressure difference would cause all or nearly all of the air to be released through the part of the tube on the side wall. Consequently it has been the practice to confine the diffuser tubing to the flat bottom of the lagoon, leaving large triangular short-circuit paths which in some cases approach half the lagoon volume.

In most cases where the parallel array was used, the tubes were relatively long and small in cross-section. They also had air-releasing openings only in their upper parts, and consequently became partially filled with water which had no way to escape. As a result, the air path within the tubes was restricted not only by the small cross-section of the tube, but by the presence of water. If the tube was long, it was considered necessary to feed it with air from both ends by means of headers in order to achieve reasonably uniform bubbling.

One important object of this invention is to provide an air diffusion apparatus which effectively eliminates short-circuiting in an aerated lagoon, one of the major limitations of the old parallel array. This object is accomplished by providing an air manifold, pumping means for supplying air to the air manifold, at least four flexible diffuser tubes, each tube being connected to receive air from the manifold and to release the air in bubble form along substantially its entire length, the connections of said diffuser tubes to the manifold, all being projectable into a horizontal circle having a radius less than approximately one-tenth of the average length of said diffuser tubes, said diffuser tubes extending substantially radially outwardly from the manifold in horizontal directions, and there being at least one of said diffuser tubes in each quadrant. An outward flow pattern induced by the release of air from diffusers so arranged insures complete aeration of an area much larger than that of the diffuser itself, and makes possible the elimination of short-circuiting.

Where the diffuser tubes in the array are so long that the aforementioned restriction of air flow is likely to take place, means are provided at the ends of the diffuser tubes for eliminating water accumulated within the tubes. This means preferably takes the form of a simple slitted diaphragm, the slit being located below the openings in the upper part of the diffuser tube. The means for elimination of water obviates the second header, the necessity for which had, in the past, kept designers from deviating from the usual parallel array.

In its preferred form, the invention utilizes fabric diffuser tubes. Fabric diffusers have been known for their ability to break up air into large numbers of very fine bubbles. Fabric diffusers have been used in the activated sludge process as indicated in U.S. Pat. No. 3,315,895 to Klingbeil et al. However they have not been satisfactorily substituted for flexible perforated plastic diffuser tubes since if made in comparable length, they tend to release bubbles in a very non-uniform manner such that some areas of the fabric tube release bubbles and others do not. It is therefore another object of this invention to provide a fabric diffuser operable in relatively long (e.g. 10 foot) lengths, and therefore suitable for use in lagoon aeration. In order to accomplish this object, the air diffuser preferably comprises an inner conduit connectable to receive air from a manifold, said inner conduit having perforations spaced along its length to release air to its exterior, a foraminous fabric tube surrounding said inner conduit and being of a size such as to provide a space at least between the perforations of said inner conduit and the interior of said fabric tube, means securing the ends of said fabric tube to said inner conduit in order to enclose the ends of said space so that escape of air from the fabric tube is limited to the foramina thereof, and means comprising a quantity of loose pellets filling said space and providing resistance to the flow of air within said space.

Other objects will be apparent from the following detailed description.

DETAILED DESCRIPTION

Figure 1:
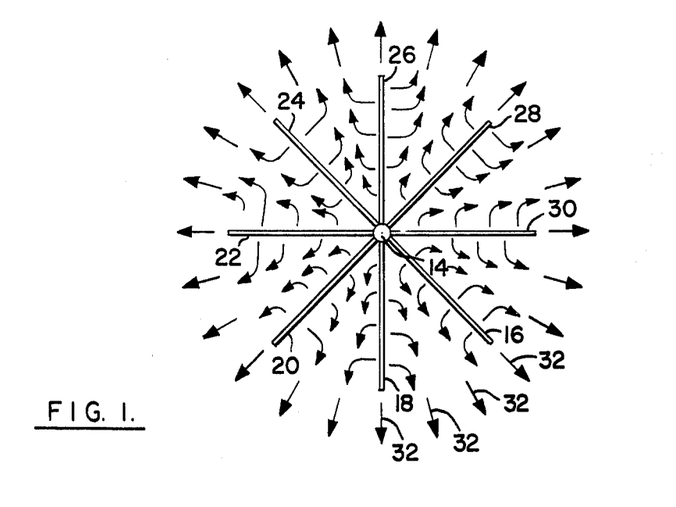
FIG. 1 is a diagrammatic top plan view of an air diffusion apparatus in accordance with the invention, showing the direction of flow of water at the surface of a lagoon, as effected thereby.
Figure 3:
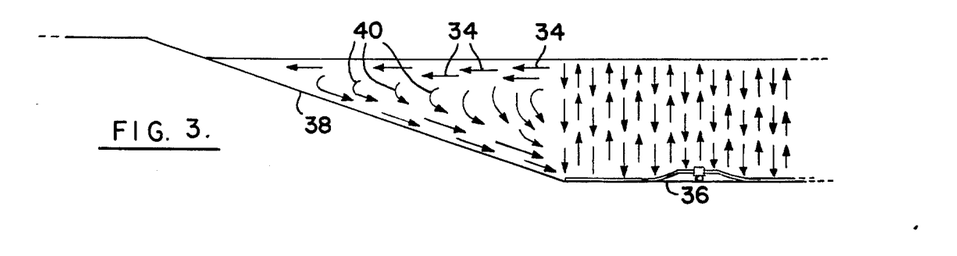
FIG. 3 is a vertical section of a lagoon having a sloping side wall, and illustrating the flow of water within said lagoon, as effected by a diffuser in accordance with the invention.

Structurally, the diffuser in accordance with the invention comprises an air manifold, and a plurality of flexible diffuser tubes extending radially outwardly from the manifold. FIG. 1 shows a typical diffuser comprising manifold 14 and diffuser tubes 16–30. In a typical installation, the diffuser lies on the bottom of a lagoon underneath ten feet of water. Each of the diffuser tubes releases bubbles of air along substantially its entire length. These bubbles produce a rising current of water above each diffuser tube and the rising current of water produces a superelevation of the surface along a line above each diffuser tube. At the surface, water flows outwardly in directions perpendicular to these lines of superelevated water. Between the rising currents of water above the diffuser tubes, there is necessarily a downward flow, as illustrated by the downwardly directed arrows in FIG. 3. In addition, however, because of the relationship between adjacent diffuser tubes, the water flowing perpendicularly from one line of superelevated water meets the corresponding flow from an adjacent line, and produces a resultant outwardly directed radial flow at the surface. This outwardly directed radial flow is illustrated by arrows 32 in FIG. 1 and by arrows 34 in FIG. 3. The water traveling outwardly along the surface away from the diffuser flows downwardly throughout the parts of the lagoon which are not directly above a diffuser. In the case of FIG. 3, which illustrates a lagoon having a horizontal, flat bottom 36 and a sloping side wall 38, the system produces a flow, illustrated by arrows 40, throughout the volume of liquid above sloping side 38.

Air is dissolved in the system by two mechanisms. As the bubbles rise from the diffuser tubes, air from the bubbles dissolves into the surrounding water at the surfaces of the bubbles. Air also dissolves from the atmosphere at the surface of the body of water. Solution of air from the atmosphere is enhanced by the surface agitation produced by the rising currents of water above the diffuser tubes. The pattern of flow produced by the diffuser, and illustrated in FIGS. 1 and 3, insures that all of the water in the lagoon is properly aerated including the water in the parts of a lagoon which are not directly above a diffuser.

In order to produce an adequate surface flow pattern, at least four diffuser tubes should be used, with at least one tube in each quadrant. By the latter expression it is meant that the tubes are so related to each other that an imaginary circle divided into four quadrants can be superimposed on the diffuser and oriented in such a way that one tube lies in each of the four quadrants of the circle. The tubes may be disposed so that the angles between adjacent tubes are equal, which is the preferred arrangement for most installations. However, it may be desired to concentrate surface flow in certain directions, for example in the case of an irregularly shaped body of water. In such a case a non-uniform distribution of the radially disposed diffuser tubes can be used. The tubes extend substantially radially outwardly from the manifold, it being understood that minor deviations from an exact radial configuration may exist, and, in fact, will necessarily exist as a result of the flexibility of the diffuser tubes and the impossibility of laying them out with perfect accuracy.

The diffuser tubes cannot radiate from a point, but their connections to the manifold should be relatively close together. Preferably, in a four tube diffuser, the tubes are connected to the manifold within a horizontal circle having a radius not greater than one-tenth of the average length of the four tubes. The connections to the manifold can be at different heights, so long as they are projectable into a horizontal circle having a radius less than approximately one-tenth of the average length of the four diffuser tubes. If desired, additional tubes of shorter length can be added to the diffuser without adversely affecting its operation.

For the best results, the diffuser should have at least eight diffuser tubes. There is no defined upper limit to the number of diffuser tubes that can be used. If eight tubes are used, as shown in FIG. 1, it is preferred that there be at least two tubes in each quadrant. Desirably, the tubes should be uniformly distributed, that is, the angle defined by each adjacent pair of diffuser tubes should be approximately equal to the angle defined by every other adjacent pair of diffuser tubes. In the case of eight tubes, the adjacent tubes would define an angle of 45°.

Figure 2:
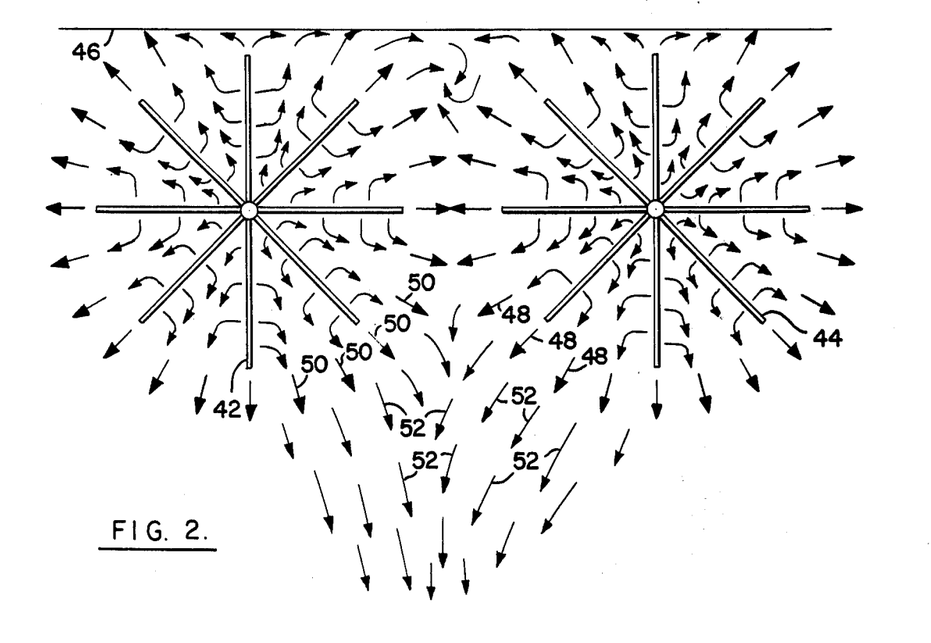
FIG. 2 is a diagrammatic top plan view of a lagoon containing a plurality of air diffusers in accordance with the invention, showing surface flow as effected by a plurality of air diffusers.

In many cases it is desirable to use more than one diffuser of the type shown in FIG. 1 in a lagoon. FIG. 2 shows a pair of diffusers 42 and 44 arranged in a lagoon adjacent a vertical barrier 46, such barriers being typically used to divide a single lagoon into two or more elongated, oppositely flowing streams. Each diffuser produces an outward flow at the surface, as is the case with a single diffuser. In the case of two or more diffusers, however, the outward surface flows collide, and produce a resultant surface flow which extends well beyond the outer reaches of the individual diffusers. Thus, as shown in FIG. 2, the outward surface flow from diffuser 44, indicated by arrows 48 collides with the outward surface flow from diffuser 42, indicated by arrows 50 to produce a resultant, laterally directed flow, indicated by arrows 52. This resultant surface flow insures adequate aeration of the portion of the lagoon laterally spaced from the halfway point between an adjacent pair of diffusers.

Figure 4:
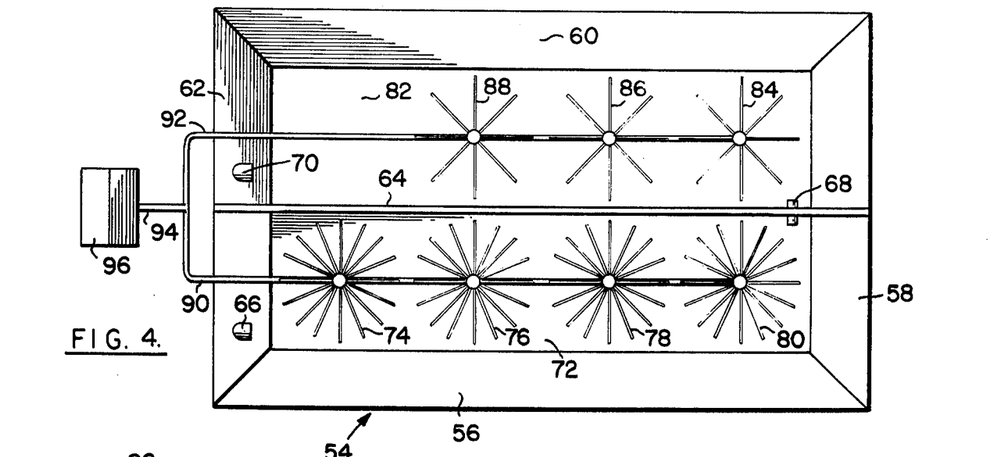
FIG. 4 is a top plan view of a typical treatment lagoon in accordance with the invention.
Figure 5:
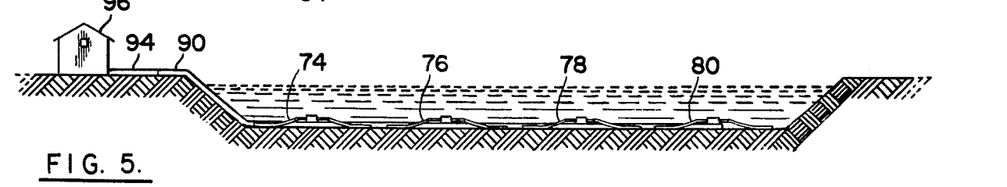
FIG. 5 is a vertical section of a treatment lagoon in accordance with the invention.

A typical installation is shown in greater detail in FIGS. 4, 5, 6 and 7. In FIG. 4, a lagoon 54, having sloping side walls 56, 58, 60 and 62, is divided into two, oppositely flowing elongated streams by a vertical, centrally located barrier 64. Sewage or liquid industrial waste flows into the lagoon through inlet pipe 66, located in side wall 62. The liquid then flows along the elongated stream between barrier 64 and side wall 56, and thence through cross-over pipe 68 into the elongated stream between barrier 64 and side wall 60. Pipe 68 extends through barrier 64 at a location preferably near side wall 58 at the end of the lagoon remote from inlet pipe 66. From cross-over pipe 68, the liquid flows through the space defined by barrier 64 and side wall 60 to an outlet pipe 70 in side wall 62. With this structure, an elongated lagoon can be established in a space having limited maximum dimensions.

Along the bottom 72 of the path between barrier 64 and side wall 56, there are arranged four diffusers 74, 76, 78 and 80, each having 16 diffuser tubes extending radially outwardly from its manifold. Along flat bottom 82 of the path between barrier 64 and side wall 60, there are arranged three diffusers 84, 86 and 88, each having six radially extending diffuser tubes. The provision of a greater number of diffuser tubes per diffuser nearer the inlet, with the number of diffuser tubes per diffuser decreasing in the direction from inlet to outlet, establishes a system for "tapered aeration" in which the stronger sewage or waste liquid entering at the inlet is more heavily aerated than the liquid nearer the outlet. Structurally, diffusers 74, 76, 78 and 80 differ from diffusers 84, 86 and 88 only in the number of diffuser tubes and in the number of outlets in the manifolds. It will be immediately evident that the diffuser system in accordance with the invention lends itself much more readily to tapered aeration than prior systems wherein specially designed headers are required. As an alternative to the specific system shown in FIG. 4, of course, the number of diffuser tubes per diffuser can decrease gradually in the direction from inlet to outlet. Any desired pattern of tapered aeration can be readily achieved with a relatively small number of different manifolds, by capping unused manifold outlets.

The diffuser manifolds in FIG. 4 are fed with air through lines 90 and 92 which are connected in common through line 94 to air pumping means within enclosure 96.

Figure 6:
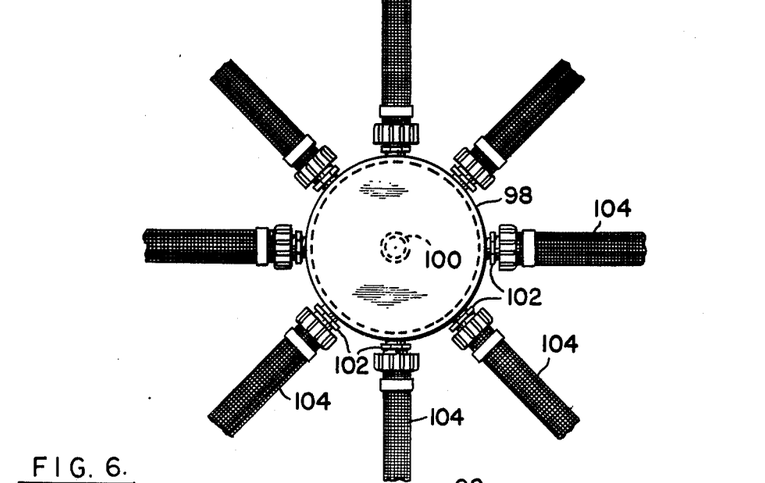
FIG. 6 is a top plan view of the air manifold of a diffuser in accordance with the invention.

A typical manifold 98 is illustrated in top plan view in FIG. 6. The manifold is preferably constituted by a cylindrical enclosure having a threaded opening 100 on its under side, and having a plurality of threaded couplings 102 spaced around its periphery and providing communication between the interior of the manifold and diffuser tubes 104 connected to these couplings.

Figure 7:
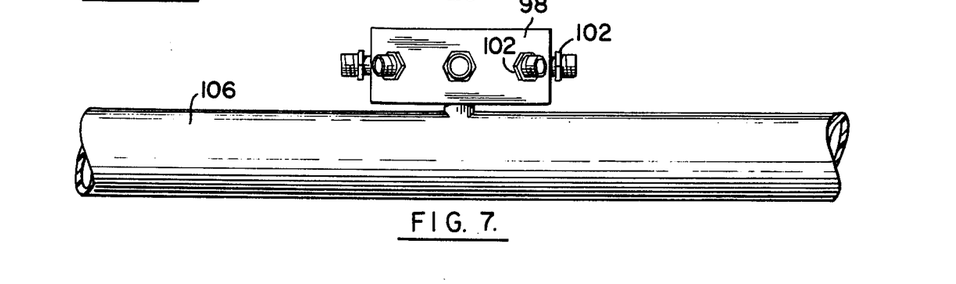
FIG. 7 is a side elevation of an air manifold.

The threaded opening 100 on the under side of the manifold connects to an air supply line 106, as shown in FIG. 7, line 106 corresponding to lines 90 and 92 in FIG. 4.

The manifold system, of course, can assume various alternative configurations, including one in which the supply line 106 is eliminated, and air is supplied to the manifold through one of the couplings corresponding to coupling 102. Air can be supplied to one or more additional manifolds through hoses connected to receive air through other couplings corresponding to couplings 102.

Figure 10:
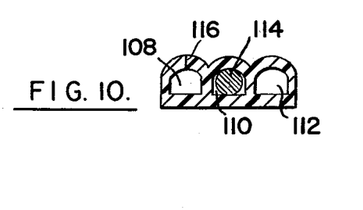
FIG. 10 is a cross-sectional view of a flexible plastic tubular diffuser which can be used in the radial configuration instead of the diffuser of FIG. 8, if desired.

One form of diffuser tubing which can be used in the system described above is illustrated in transverse cross-section in FIG. 10. The tubing is a polyvinyl chloride extrusion having three parallel internal passages 108, 110 and 112. The central passage 110 contains a lead wire 114 which serves the purpose of weighting the diffuser down, and keeping it in a moderately stiff condition to insure that it will remain in position on the bottom of a lagoon. A slit for releasing air is shown at 116 in passage 108. Both of passages 108 and 112 have series of slits along their lengths. Typically, the slits in a given passage are three inches apart, with the slits in the respective opposite passages being staggered so that, in the diffuser tube as a whole, the slits are spaced at one and a half inch intervals in the lengthwise direction.

When the tubing of the type just described is not in use, water tends to accumulate in the air passages 108 and 112 by reverse flow through the slits no matter how carefully they are formed. Even while the tubing is in use, water accumulates by condensation. The application of air pressure through the tube at the end connected to the manifold forces some of the accumulated water out through the slits. But, only a small portion of the water can be pushed out in this manner. Eventually, a sufficient amount of air enters the tube so that there is air above all of the water in the passages. At that point, no further water can be forced out through the slits. The water within the tube leaves only a very small passage for the flow of air to the far end. Consequently, there exists a resistance to flow, which causes most of the air, if not all of it, to be released through the slits near the manifold. These slits become distended because of the high flow of air through them, and very little, if any, reaches the slits at the far end of the tube. This undesirable situation has been recognized in a number of patents including U.S. Pat. No. 3,782,701, issued on Jan. 1, 1974 to Harold G. Hunt, and in U.S. Pat. No. 3,848,623, issued Nov. 19, 1974 to Harold J. Schramm et al. The solutions to the problem proposed in these patents are relatively complex, and while they are admirably suited for reservoir aeration systems, they are too complex for general use in sewage and waste treatment wherein a large number of diffuser tubes are typically used.

Figure 11:
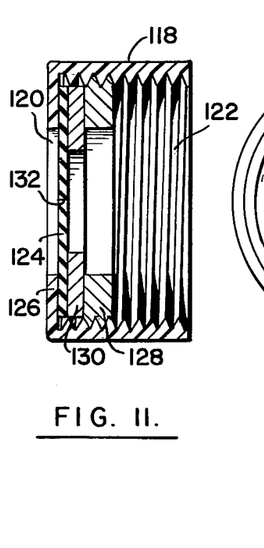
FIG. 11 is a longitudinal section of an end cap with a slitted diaphragm for eliminating water from the interior of a diffuser tube, especially a tube of the kind shown in FIG. 10.
Figure 12:
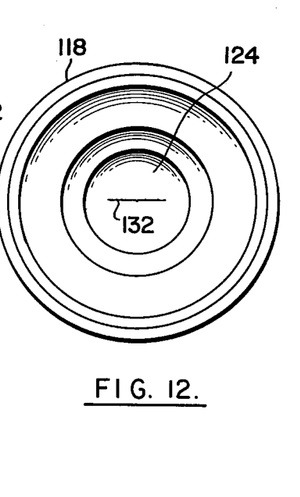
FIG. 12 is an elevational view of the end cap of FIG. 11, as viewed from the right-hand side thereof.

In accordance with the invention, the far ends of the diffuser tubes corresponding to FIG. 10 are provided with end caps of the kind illustrated in FIGS. 11 and 12. The end cap has an internally threaded body 118 having a circular opening 120 at one end, narrower than the minor diameter of the threads 122. A neoprene diaphragm 124 is clamped against wall 126 in body 118 by threaded ring 128, there being provided a washer 130 between diaphragm 124 and ring 128. The diaphragm is more flexible than the material from which the tubing is made and is provided at its center with a slit 132 through which excess water in the diffuser tube passes. The greater flexibility of the diaphragm permits water to flow through the slit therein much more rapidly than it would flow through the slits in the upper side of the diffuser tubing.

In operation, when the diffuser tube is filled with water and air is initially applied at the manifold end, water is rapidly forced out through slit 132 in the diaphragm so that relatively little water is left in the diffuser tube in comparison with what would be present if the tube were closed at its end and water were forced out through the slits in the upper part of the tube. Remarkably, the release of air through the diaphragm is not excessive and it does not interfere with the normal operation of the diffuser.

This removal of water permits relatively long lengths of diffuser tubing, i.e. lengths greater than 10 feet, to release bubbles along their entire lengths, even though they are fed with air at only one end by a manifold. The slitted diaphragm shown in FIGS. 11 and 12 is extremely simple and inexpensive to use; completely eliminates the need for a pair of parallel headers, one on each side of a lagoon, and thus makes practical the use of a cylindrical manifold and a radial diffuser tube configuration using relatively long diffuser tubes.

While the extruded polyvinyl chloride tube of FIG. 10 has been successful for use in diffused aeration, fabric tubes are more desirable in many cases because of their ability to divide air into extremely fine bubbles for more effective solution in water.

Fabric tubes are used in activated sludge treatment plants, and are typically made from synthetic linear polyamides such as nylon, from copolymers of vinyl chloride and vinylidene chloride of the type known commercially as "Saran" from "Orlon" or other synthetic plastic materials, or from canvas or other suitable textile materials, from metal, or from other suitable fabrics strong enough to withstand the action of sewage and the pressure of the liquid in which the diffuser is immersed. The interstices in these foraminous fabric tubes are small enough to cause the air to pass through the fabric into the liquid in which the tube is immersed in fine bubbles to provide optimum aeration of the liquid.

While such fabric diffusers have been successfully used in aeration of activated sludge treatment plants, they are typically used in the relatively short (eg. 3 foot) lengths of knee-action type diffusers. Fabric diffusers of this type are not suitable for lagoon aeration because they cannot be made to operate in the longer lengths (eg. 10 feet or more) required for successful lagoon aeration. When made in the longer lengths, fabric tubes tend to release air at isolated locations rather than uniformly throughout their lengths. Such tubes would thus produce unpredictable aeration patterns unsuitable for use in various lagoon aeration systems, and particularly unsuitable for use in a radial diffuser system wherein outward surface flow is desired as explained previously herein.

Figure 8:
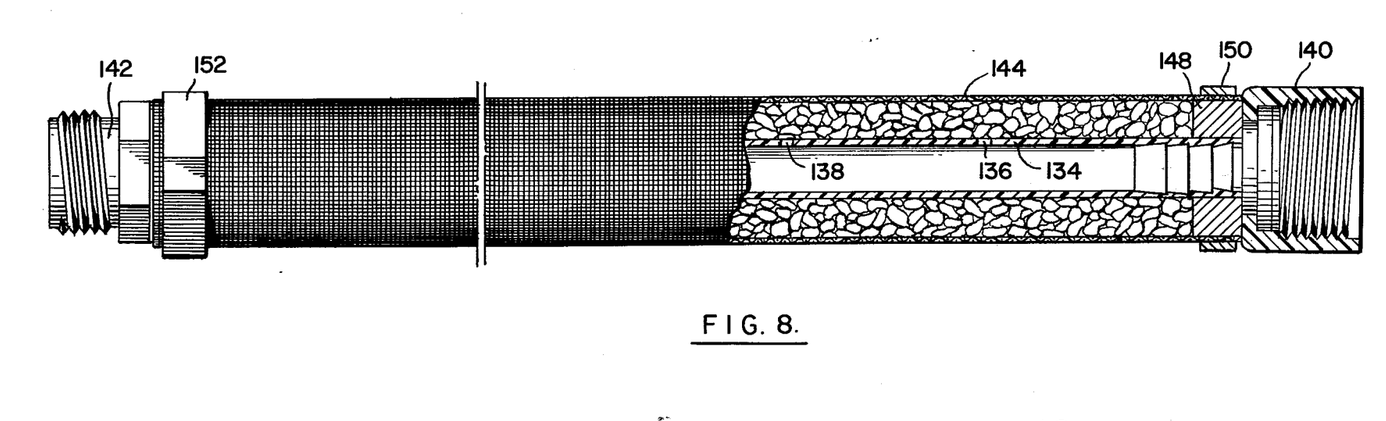
FIG. 8 is a side elevation view, partly in section, of a fabric tube diffuser in accordance with the invention.
Figure 9:
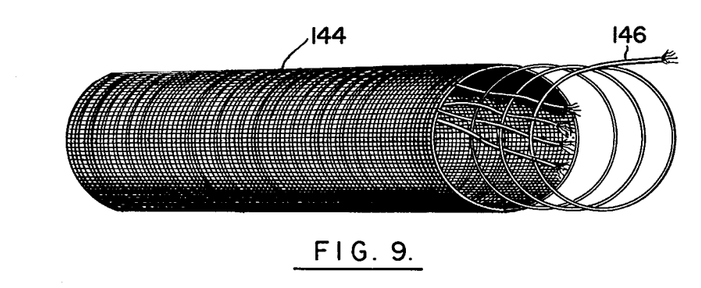
FIG. 9 is an isometric view of a partially unraveled fabric covering of the diffuser of FIG. 8, illustrating the construction thereof.

With reference to FIGS. 8 and 9, the fabric diffuser in accordance with the invention comprises a flexible plastic tube 134 provided with a series of transverse perforations 136 and 138, and with a hose coupling 140 adapted to thread onto the couplings of a manifold, as illustrated in FIG. 6. A male coupling 142 is provided at the opposite end of tube 134. This male coupling is normally capped, when the diffuser is in operation, either by a cap which provides a complete closure or, if desired, by a cap of the type shown in FIG. 11.

Tube 134 constitutes an inner conduit, and is surrounded by a foraminous fabric tube 144 which is spaced from the perforations of tube 134. Fabric tube 144 may be made from any of the materials from which fabric tubes have heretofore been made. Preferably, it is woven, and is constituted by a continuous coil 146, and lengthwise strands, four of which are shown in FIG. 9.

A ring 148 is provided at the manifold end of the diffuser tube to separate the end of fabric tube 144 from the end of tube 134, and to provide a closure for the end of the space therebetween. A clamping ring 150 secures the end of the fabric tube to the outside of ring 148. A ring similar to ring 148 (not shown) and a clamping ring 152 are provided at the opposite end of the diffuser tube.

The space between tube 134 and fabric tube 144 is preferably, though not necessarily, uniform in width. It is filled with pellets which provide a restriction in the passage of air from transverse openings 136 and 138 to the fabric tube. The restriction provided by these pellets accounts for the ability of this diffuser to release bubbles with a high degree of uniformity along substantially its entire length. The pellets are preferably composed of washed gravel which may be introduced into the space between tubes 134 and 144 pneumatically. The equivalent diameter of the gravel pellets is preferably within the range of $\frac{1}{8}$ inch to $\frac{1}{4}$ inch. That is, with minor exceptions, the volume V of any given pellet is such that its equivalent diameter $d$, as determined by the equation $d = \sqrt[3]{6V/\pi}$ is between $\frac{1}{8}$ and $\frac{1}{4}$ inch. Various other materials such as lead shot may be used, but gravel has been found to be entirely satisfactory, allowing uniform air diffusion along lengths of tubing well in excess of ten feet.

While a water elimination device such as the diaphragm system shown in FIGS. 11 and 12 may be used in conjunction with the foraminous fabric diffuser, and may be desirable, especially if the openings in the inner conduit are all on the upper side thereof, special water elimination means are not normally necessary, as the transverse openings in tube 134 can be along the sides or along the bottom thereof if desired without detrimental effect.

Experimentation has shown that the pellets between the inner conduit and the foraminous fabric tube of the diffuser of FIG. 8 are effective in producing a uniform distribution of air when the diffuser is relatively long. The pellets therefore make it possible to utilize this superior type of diffuser in lagoon and reservoir aeration.

Various modifications can be made to the apparatus herein described without departing from the scope of the invention as defined in the following claims.

I claim:

1. A system for treating sewage or liquid industrial waste by aeration comprising:
    a lagoon for temporarily containing said sewage or liquid industrial waste during aeration thereof, said lagoon having a substantially flat bottom portion and at least one sloping side extending upwardly and outwardly from said bottom portion;
    a plurality of air diffusers within said lagoon, located on and essentially confined to said bottom portion, each of said diffusers comprising an air manifold and at least four flexible diffuser tubes, each tube being connected to receive air from said manifold and to release said air in bubble form along substantially its entire length; the connections of said diffuser tubes to said manifold, all being projectable into a horizontal circle having a radius less than approximately one-tenth of the average length of said diffuser tubes, and said diffuser tubes extending substantially radially outwardly from said manifold in horizontal directions, there being at least one of said diffuser tubes in each quadrant; and
    pumping means for supplying air to each manifold in the system;
    said diffusers being arranged adjacent said sloping side, and at least two of the flexible tubes of each diffuser being arranged to diverge from each other in the direction from the manifold thereof toward said sloping side, whereby a resultant outwardly directed radial surface flow is produced above said sloping side.

2. A system according to claim 1 in which said lagoon is elongated and is provided with inlet means for the inward flow of sewage or liquid industrial waste near one of the narrower ends and outlet means for the outward flow near the opposite one of said narrower ends, and wherein said diffusers are arranged in a lengthwise series within said lagoon.

3. A system according to claim 1 in which said lagoon is elongated and is provided with inlet means for the inward flow of sewage or liquid industrial waste near one of the narrower ends and outlet means for the outward flow near the opposite one of said narrower ends, and wherein said diffusers are arranged in a lengthwise series within said lagoon, with the number of diffuser tubes per diffuser decreasing in the direction from inlet to outlet in order to accomplish tapered aeration.

4. A system according to claim 1 in which the diffusers of said plurality are located sufficiently close to each other to produce an interfering flow which produces a resultant surface flow directed over said sloping side at a location between adjacent diffusers.

5. Air diffusion apparatus for aerating bodies of water such as reservoirs or sewage or waste treatment lagoons, comprising:
    an air manifold;
    pumping means for supplying air to said air manifold; and
    a plurality of flexible diffuser tubes, each tube being connected to receive air from said manifold and to release air in bubble form along substantially its entire length;

each of said diffuser tubes comprising an inner conduit connected to receive air from said manifold, said inner conduit having perforations spaced along its length to release air to its exterior, a foraminous fabric tube surrounding said inner conduit and being of a size such as to provide a space at least between the perforations of said inner conduit and the interior of said fabric tube, means securing the ends of said fabric tube to said inner conduit in order to enclose the ends of said space so that escape of air from the fabric tube is essentially limited to the foramina thereof, and means comprising a quantity of loose pellets filling said space and providing resistance to the flow of air within said space.

6. Air diffusion apparatus according to claim 5 in which the connections of said diffuser tubes to said manifold are all projectable into a horizontal circle having a radius less than approximately one-tenth of the average length of said diffuser tubes, and said diffuser tubes extend substantially radially outwardly from said manifold in horizontal directions, there being at least one diffuser tube in each quadrant.

7. Air diffusion apparatus according to claim 5 in which the fabric tubes are at least 10 feet in length.

8. Air diffusion apparatus according to claim 5 in which the equivalent diameter of said pellets is within the range of ⅛ to ¼ inch.

9. Air diffusion apparatus according to claim 5 in which said pellets are composed of gravel.

10. Air diffusion apparatus according to claim 5 in which said foraminous fabric tube is spaced, throughout its circumference, from said inner conduit throughout substantially the entire length of the fabric tube.

11. Air diffusion apparatus according to claim 5 in which each inner conduit has, at the end remote from said manifold, a slit valve means, said slit valve means being positioned in relation to said perforations to release water from said inner conduit during start-up.

12. A flexible air diffuser tube for aerating bodies of water such as reservoirs or sewage or waste treatment lagoons, comprising:
a flexible inner conduit connectable to receive air from a manifold, said inner conduit having perforations spaced along its length to release air to its exterior, a foraminous fabric tube surrounding said inner conduit and being of a size such as to provide a space at least between the perforations of said inner conduit and the interior of said fabric tube, means securing the ends of said fabric tube to said inner conduit in order to enclose the ends of said space so that escape of air from the fabric tube is essentially limited to the foramina thereof, and means comprising a quantity of loose pellets filling said space and providing resistance to the flow of air within said space.

13. An air diffuser tube according to claim 12 in which said fabric tube is at least 10 feet in length.

14. An air diffuser tube according to claim 12 in which the equivalent diameter of said pellets is within the range of ⅛ to ¼ inch.

15. An air diffuser tube according to claim 12 in which said pellets are composed of gravel.

16. An air diffuser tube according to claim 12 in which said foraminous fabric tube is spaced from said inner conduit throughout its length except at the ends of said tube.

17. An air diffuser tube according to claim 12 in which said inner conduit has at an end remote from the point at which it is connectable to receive air from said manifold, a slit valve means positioned in relation to said perforations to release water from said inner conduit during start-up.

18. Air diffusion apparatus for aerating bodies of water such as reservoirs or sewage or waste treatment lagoons comprising:
an air manifold;
pumping means for supplying air to said air manifold; and
a plurality of flexible diffuser tubes adapted to release air in bubble form along substantially its entire length, each diffuser tube being connected at one end to receive air from said manifold,
each diffuser tube being adapted to lie horizontally in said body of water with well defined upper and lower portions and being provided with transverse openings in its wall, said openings being confined to the upper part of the tube when said tube is in its horizontal position in a body of water, and
each diffuser tube having slit valve means located at its opposite end, said slit valve being positioned to release water from said tube during start-up.

19. Air diffusion apparatus according to claim 18 in which each diffuser tube is provided at its said other end with a resilient diaphragm, and in which said slit valve means comprises a slit formed in said diaphragm.

20. A system for aeration comprising:
a lagoon having a substantially flat bottom portion and at least one sloping side extending upwardly and outwardly from said bottom portion;
an air manifold located on said bottom portion of said body;
pumping means for supplying air to said air manifold; and
an array of at least four flexible diffuser tubes also located on and essentially confined to said bottom portion of said lagoon, and arranged adjacent said sloping side, each tube in said array being connected to receive air from said manifold and to release said air in bubble form along substantially its entire length;
the connections of the diffuser tubes in said array to said manifold, all being projectable into a horizontal circle having a radius less than approximately one-tenth of the average length of said diffuser tubes; and
the diffuser tubes in said array extending substantially radially outwardly from said manifold in horizontal directions below the lowest normal liquid level in said lagoon, there being at least one of said diffuser tubes in each quadrant whereby an outwardly directed radial flow is produced at the surface of the liquid in said lagoon by reason of the interaction of the flows produced by adjacent diffuser tubes, and at least two of the flexible tubes of said array being arranged to diverge from each other in the direction from the manifold thereof toward said sloping side, whereby a resultant outwardly directed radial surface flow is produced above said sloping side.

21. An aeration system according to claim 20 in which said array comprises at least eight diffuser tubes.

22. An aeration system according to claim 20 in which said array comprises at least eight diffuser tubes, there being at least two diffuser tubes in each quadrant.

23. An aeration system according to claim 20 in which said array comprises at least eight diffuser tubes, the angle defined by each adjacent pair of diffuser tubes being approximately equal to the angle defined by every other adjacent pair of diffuser tubes in said array.

24. An aeration system according to claim 20 in which each of said diffuser tubes has, at the end remote from said manifold, slit valve means for releasing water from said tube during start-up.

* * * * *

UNITED STATES PATENT AND TRADEMARK OFFICE
CERTIFICATE OF CORRECTION

PATENT NO. : 4,048,072
DATED : September 13, 1977
INVENTOR(S) : J. Robert McCullough It is certified that error appears in the above-identified patent and that said Letters Patent are hereby corrected as shown below:

At column 10, line 36, change "body" to --lagoon--.

Signed and Sealed this

Fourth Day of July 1978

[SEAL]

Attest:

RUTH C. MASON
Attesting Officer

DONALD W. BANNER
Commissioner of Patents and Trademarks